US008171492B2

(12) United States Patent
McGuire et al.

(10) Patent No.: US 8,171,492 B2
(45) Date of Patent: May 1, 2012

(54) SYSTEMS AND/OR METHODS FOR END-TO-END BUSINESS PROCESS MANAGEMENT, BUSINESS EVENT MANAGEMENT, AND/OR BUSINESS ACTIVITY MONITORING

(75) Inventors: Steve McGuire, Leesburg, VA (US); Thomas Gläser, Fairfax, VA (US)

(73) Assignee: Software AG, Darmstadt (DE)

( * ) Notice: Subject to any disclaimer, the term of this patent is extended or adjusted under 35 U.S.C. 154(b) by 607 days.

(21) Appl. No.: 12/385,115

(22) Filed: Mar. 31, 2009

(65) Prior Publication Data
US 2010/0251264 A1   Sep. 30, 2010

(51) Int. Cl.
*G06F 3/00* (2006.01)
(52) U.S. Cl. ........................................ 719/310; 719/318
(58) Field of Classification Search .................. 719/310, 719/318
See application file for complete search history.

(56) References Cited

U.S. PATENT DOCUMENTS

| | | | |
|---|---|---|---|
| 6,208,345 B1 | 3/2001 | Sheard et al. | |
| 6,738,975 B1 | 5/2004 | Yee et al. | |
| 7,426,736 B2 | 9/2008 | Cole et al. | 719/318 |
| 7,716,676 B2 * | 5/2010 | Sawicki et al. | 719/313 |
| 2008/0120129 A1 * | 5/2008 | Seubert et al. | 705/1 |
| 2009/0063664 A1 | 3/2009 | Tiberio, Jr. | 709/222 |
| 2009/0064182 A1 | 3/2009 | Holar et al. | 719/314 |

FOREIGN PATENT DOCUMENTS

EP    2 031 818    3/2009

OTHER PUBLICATIONS

Feng Liu, Web Service for Distributed Communication Systems, 2006.*
Trythall, S, "JMS and CORBA Notification Interworking" Internet Citation, (Online) XP002274907 Retrieved from the Internet: URL:onjava.com./pub/a/onjae/2001 /12/12/jms_not.html> (retrieved on Mar. 24, 2004), dated Dec. 12, 2001.

* cited by examiner

*Primary Examiner* — Lechi Truong
(74) *Attorney, Agent, or Firm* — Nixon & Vanderhye PC

(57) ABSTRACT

The example embodiments disclosed herein relate to application integration techniques built around the publish-and-subscribe model (or one of its variants). In certain example embodiments, application integration techniques for managing and/or monitoring a business process comprising a plurality of activities, events, and/or objects located in at least one resource external to the application integration system and a process engine thereof are provided. During design time, by introspecting the business object types involved in the activities, events, and/or objects of the at least one resource, potential state changes may be identified, and an integrative linkage may be established, with the integrative linkage being managed and maintained by a process monitoring agent (PMA). During runtime, the PMA may "listen" to the business object state changes in the at least one external resource and notify the local process engine accordingly.

14 Claims, 8 Drawing Sheets

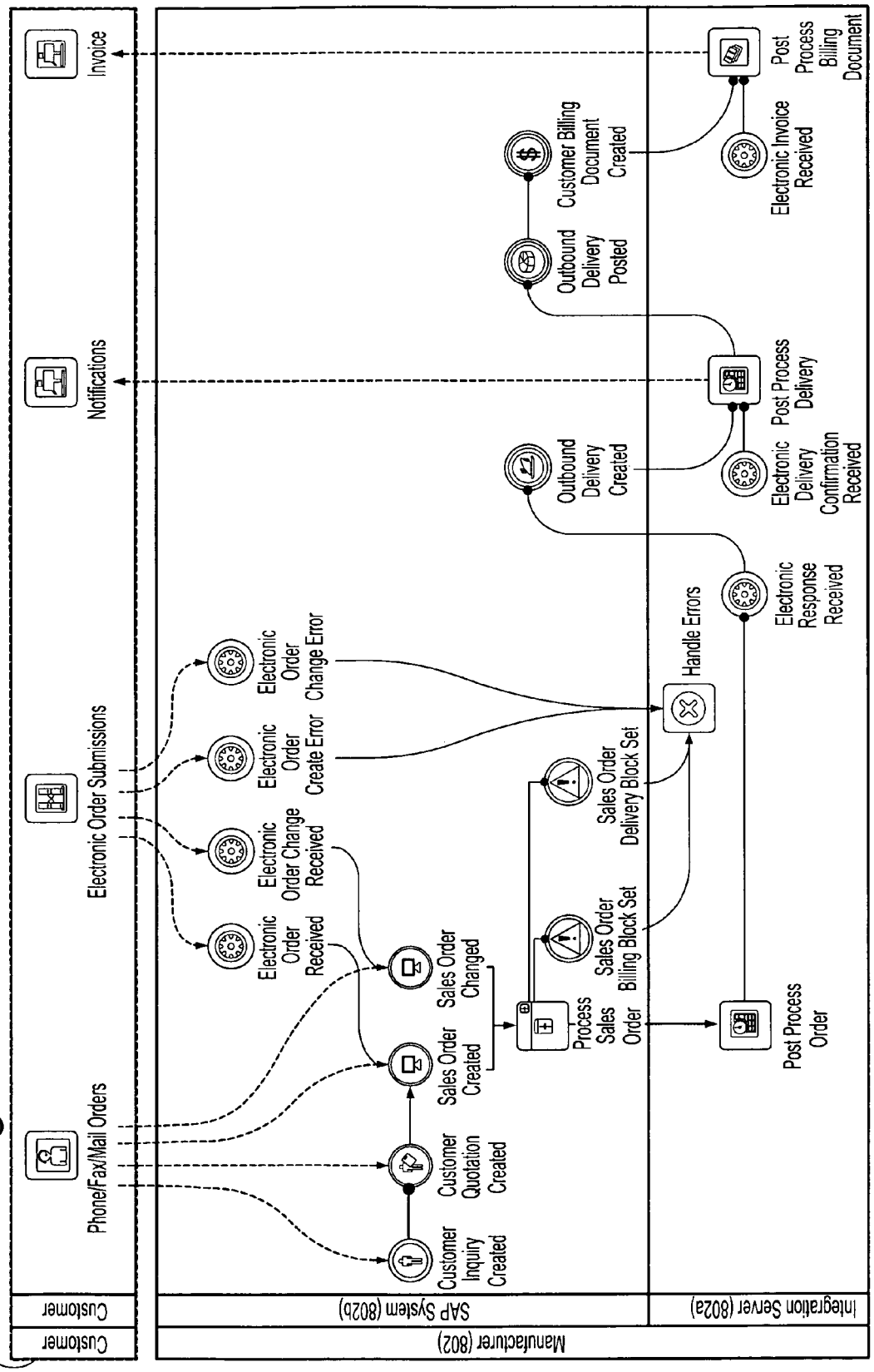

SYSTEMS AND/OR METHODS FOR END-TO-END BUSINESS PROCESS MANAGEMENT, BUSINESS EVENT MANAGEMENT, AND/OR BUSINESS ACTIVITY MONITORING

FIELD OF THE INVENTION

The example embodiments disclosed herein relate to application integration techniques and, more particularly, to application integration techniques for managing and/or monitoring a business process comprising a plurality of activities, events, and/or objects located in at least one resource external to the application integration system and a process engine thereof. In certain example embodiments, during design time, by introspecting the business object types involved in activities, events, and/or objects of the at least one resource, potential state changes for these business object types may be identified, and an integrative linkage may be established, with the integrative linkage being managed and maintained by a process monitoring agent (PMA). In certain example embodiments, during runtime, the PMA may "listen" to the state changes for these activities, events, and/or objects in the at least one external resource and notify the local process engine accordingly. Thus, the runtime and design time components of certain example embodiments advantageously may be leveraged to provide end-to-end visibility into business processes, including monitoring and/or management of activities, events, and/or other like elements of the at least one external resource.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns.

Although various techniques have been somewhat successful in providing solutions to these challenge areas, further enhancements are still possible. For example, a number of vendors provide certain business activity monitoring (BAM), business process management (BPM), and/or other related products as part of their application suites. Example backend systems include SAP, Oracle, and others. Typically, the products provided by these vendors can only "see" and control their own domains. Thus, to the extent that these vendors provide a process engine to orchestrate the services that are offered, such conventional process engines are restricted to operation within the respective limited domains. Accordingly, when a plurality of resources are provided and are to be integrated (e.g., during application integration), the individual process engines belonging to the resources generally do not know exactly what other activities, events, etc., are occurring in other resources and cannot monitor/manage them because they exist within "closed" systems. Similarly, a user trying to integrate the disparate resources cannot always monitor/manage the activities, events, etc., in a desired and/or necessary manner—even though the user has at least some general knowledge that various activities, events, etc., are taking place.

Currently, there are no known prior art techniques that enable a process engine to monitor/manage activities hosted on an external resource. In fact, to the extent that the prior art approaches can be modified to approximate the features, aspects, and advantages of the example embodiments described herein, such prior art systems would require alterations to the underlying external resource to manually establish an integrative linkage from the resource to the remote processing engine. For some vendors, additional functionality typically must be deployed from a would-be orchestrating process engine directly into the resource itself. This typically requires an alteration to existing application logic in the external resource, which might be cumbersome and/or even impossible.

Thus, it will be appreciated that there is a need in the art to provide monitoring and/or management capabilities across platforms in the application integration context.

One aspect of certain example embodiments relates to providing end-to-end business process management (BPM), business event management (BEM), business activity monitoring (BAM), and/or the like.

Another aspect of certain example embodiments relates to providing a process management agent (PMA) that acts as an interface between a central process engine and external (e.g., third-party) resources. One or many actual PMAs and/or PMA instances may be provided in this regard.

A further aspect of certain example embodiments relates to providing monitoring and/or management capabilities across platforms via a process engine.

Yet another aspect of certain example embodiments relates to using a PMA manage and/or monitor aspects of business process in a transparent manner.

It will be appreciated that the example embodiments described herein function at the "business process level." In other words, it will be appreciated that the example embodiments described herein are concerned with activities, events, and/or other like features that exist at the business process layer. In this regard, certain example embodiments are premised on the idea that if activities, events, and/or the like are known, programmed logic circuitry can "listen" for the same and report them back to an orchestrating, monitoring, and/or otherwise functioning process engine. As such, it will be appreciated that certain example embodiments have design time and runtime components. For instance, certain example embodiments enable a user, at design time, to cause a resource to behave in a known manner, e.g., by reporting aspects of its functioning, so that a process engine and any necessary adapters can, at runtime, provide end-to-end monitoring and/or management of the integrated application.

In certain example embodiments of this invention, a method is provided in an application integration system for managing and/or monitoring a business process comprising a plurality of activities, events, and/or objects located in one or more resources external to the application integration system and a process engine thereof. During design time, business object types of the activities, events, and/or objects of the at least one resource are introspected. Potential state changes for the business object types are identified. Business object type state change to receiver couplings are established via a process monitoring agent in communication with the at least one resource and the process engine. During runtime, the process monitoring agent is caused to listen to the business object state changes in the at least one resource through an adapter. When a business object state change is detected by the process monitoring agent, the process monitoring agent is caused to notify the local process engine of the detected business object state change by producing a document processable by the process engine in accordance with an appropriate coupling.

In certain example embodiments of this invention, a method of configuring an application integration system for end-to-end business process management, business event management, and/or business activity monitoring, is provided. A connection between a process engine and at least one resource external to the process engine is established. The at least one resource includes at least one activity, event, or object useful in modeling a business process that is representable as an event at the process engine. At least one business object type of one said activity, event, or object is identified. A business object type is selected for further introspection. The selected business object type is introspected to identify a state change thereof. A selected state change of the selected business object type is introspected to identify business object state change properties. A matching local document type suitable for processing by the process engine corresponding to the selected state change of the selected business object type is created. A coupling is established for the selected state change of the selected business object type via the process monitoring agent. A receiver is assigned for the coupling, with the receiver being connected to the process monitoring agent such that the receiver is configured to trigger a notification according to the matching local document type in the application integration system. A matching adapter notification is generated. The matching adapter notification is enabled. The adapter notification is added as an event in the process model. The process model is deployed to the process engine such that the process engine is configured to listen to state changes from the at least one remote resource in managing and/or monitoring the business process.

In certain example embodiments of this invention, a method of operating an application integration system for end-to-end business process management, business event management, and/or business activity monitoring is provided. The application integration system is configured as described above. Additionally, an indication of a state change of an activity at the process monitoring agent is received in accordance with a pre-defined coupling. An event container of the indication is analyzed, and a corresponding adapter notification is selected. The event container is transformed into a document of a document type processable by the process engine. The document is forwarded to the process engine in managing and/or monitoring the business process.

It will be appreciated that certain example embodiments relate to corresponding systems that help implement the above-described methods of certain example embodiments.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 8 is an example "order to cash" business process used to illustrate several aspects of certain example embodiments.

DETAILED DESCRIPTION OF EXAMPLE EMBODIMENTS OF THE INVENTION

A description of an illustrative application integration system and its example methods of operation will now be provided. It will be appreciated that the following description is provided by way of example and without limitation.

Certain example embodiments relate to techniques that enable a process engine to manage and/or monitor a network of distributed activities and events triggered in an external resource including, for example, those activities and events triggered by a business application system such as, for example, enterprise resource planning (ERP) systems, customer relationship management (CRM) systems, and/or the like. Indeed, certain example embodiments represent the activities executed in the external resource as events in an end-to-end business process managed and/or monitored by a local process engine. The techniques of certain example embodiments advantageously may enable this sort of management and/or monitoring to be enabled in a way that does not absolutely require alterations to the existing application logic in the external resource. Thus, by having the local process engine configured to provide business activity monitoring, in accordance with certain example embodiments, end-to-end visibility in the business process may be enabled and/or improved over existing techniques.

The example embodiments disclosed herein may have design time and/or runtime components, and further details of each of these components will be described in greater detail below. The following brief description provides context for the more detailed examples given below. First, during design time, by introspecting the business object types involved in the activity executed by the external resource, the potential state changes for these business object types are identified, and an integrative linkage is established. The integrative linkage is managed and maintained automatically by the new component. Second, during runtime, the new component "listens" to the events from the external resource and notifies the local process engine accordingly. By enabling the external resource to provide an optional correlation id along with its event container, the local process engine may manage and/or monitor the sequence or message flow, etc., between external activities and/or events, as well as the sequence or message flow, etc. from external events to local activities/events. Thus, the runtime and design time components of certain example embodiments may be leveraged to provide end-to-end visibility into business processes, including management and/or monitoring of activities, events, and/or other like elements of one or more external resources.

Figure 1:
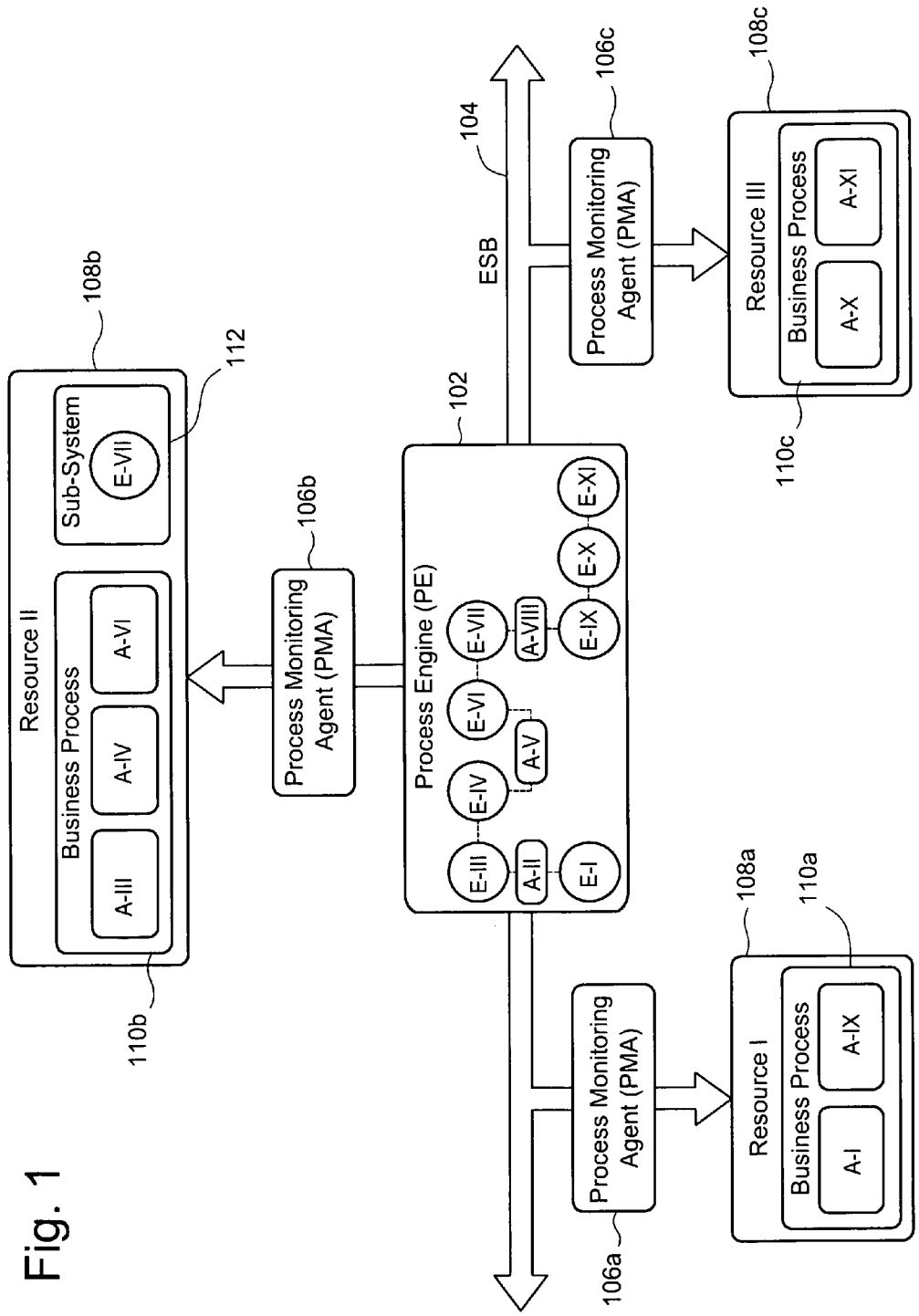
FIG. 1 is a block diagram of a network of data processing systems in accordance with an example embodiment.

Referring now more particularly to the drawings, FIG. 1 is a block diagram of a network of data processing systems in accordance with an example embodiment. The network of data processing systems includes an enterprise service bus (ESB) 104 which, by itself, is an application integration system that functions as the medium used to provide communication links between the various resources. The ESB 104 of FIG. 1 may be, for example, a webMethods Enterprise Service Bus, which is commercially available from the assignee of the instant invention. In the FIG. 1 example embodiment, the process engine (PE) 102 and the process monitoring agents (PMAs) 106a-c are integrated components of the ESB 104. The PE 102 essentially manages/monitors the run-time execution of an end-to-end business process. By contrast, the resources 108a-c are data processing systems connected to the ESB. These resources 108a-c may be, for example, application servers, transaction systems, databases, etc. As will be described in greater detail below, a PMA may work together with an adapter to interface with an external resource. It will be appreciated that, in some respects, the ESB 104 may be considered synonymous with the overall system 200 of FIG. 2. For example, a PMA 106 may be a part of an integration server, such that it serves as an extension to any adapters 206 located therein (including, for example, integration servers 202' and 202" in FIG. 2, where adapters are located). It will be appreciated that the FIG. 1 network of data processing systems may include additional, alternative, or fewer resources, i.e., making the FIG. 1 only a single non-limiting example embodiment and is not indicative of any architectural limitations of the present invention.

A business process 110 may span one or more networks shown in the FIG. 1 example embodiment. A business process 110 also may comprise activities and events taking place in one resource, several resources, within the ESB 104 itself, etc. In the FIG. 1 illustrative example, activities 1 and 9 take place in a first resource 108a as a first business process portion 110a; activities 3, 4, and 6 take place in a second resource 108b as a second business process portion 110b; activities 10 and 11 take place in a third resource 108c as a third business process portion 110c; and activities 2, 5, and 8 take place in the ESB 104 directly, e.g., orchestrated by the PE 102. Additionally, in the FIG. 1 illustrative example, successful completion of the second business process portion 110b executed in the second resource 108b results in the triggering of event 7 from sub-system 112 located in the second resource 108b. Other events are triggered in the PE 102 in accordance with the processing of the activities in the external resources, e.g., as enabled by the PMAs 106a-c, as will be described in greater detail below. By representing the activities executed in the external resources 108a-c as events of an overall business process 110 managed and/or monitored by the PE 102 and also enabling the ESB 104 to "listen" to events triggered by the external resources 108a-c, the ESB 104 may be made to provide end-to-end visibility into the business process 110. As indicated above, the activities/events that take place in the external resources 108a-c are represented by events in the PE 102.

Figure 2:
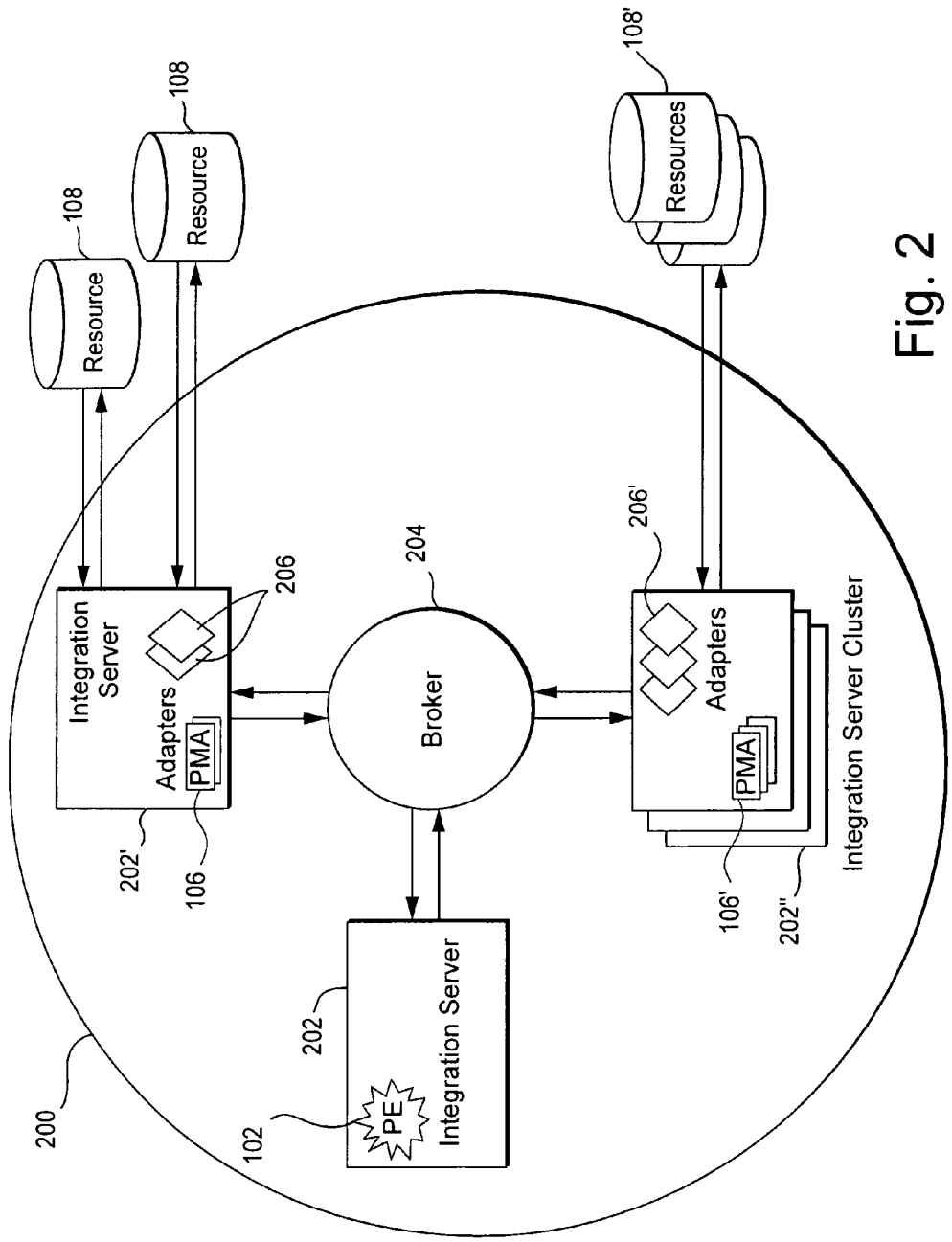
FIG. 2 is a schematic view of an illustrative application integration system in accordance with an example embodiment.

A general description of how the components attached to the ESB 104 work is provided in connection with FIG. 2. FIG. 2 is a schematic view of an illustrative application integration system 200 in accordance with an example embodiment. As alluded to above, the components within application integration system 200 are essentially "added" to the ESB 104. A plurality of integration servers 202 are shown, each being in communication with a broker 204. A first integration server 202 is shown, as is a second integration server 202', which includes a plurality of adapters 206. An integration server cluster 202" also is shown, and it includes a plurality of adapters 206' provided thereto.

In general, the integration server is the system's central run-time component. It serves as the entry point for the systems and applications to be integrated, and it is the system's primary engine for the execution of integration logic. It also provides the underlying handlers and facilities that manage the orderly processing of information from resources 108 (or clustered resources 108') inside and/or outside the enterprise. In these regards, each integration server 202, 202', 202" might host a process engine (or process engine instance). In this example embodiment, integration server 202 hosts the process engine (or process engine instance) 102. The integration server 202' which is connected to a plurality of external resources 108 includes a plurality of PMAs 106 and, similarly, the integration server cluster 202" which is connected to clustered resources 108' includes a plurality of PMAs 106'.

Commonly assigned application Ser. No. 11/896,312 (which is hereby incorporated herein by reference) describes the operation of an example process engine in accordance with an example embodiment, and further describes how the process engine of certain example embodiments may be used in a distributed environment.

The integration server 202 publishes documents to and receives documents from the broker. The broker 204 forms the potentially globally scalable messaging backbone of the example components described herein. It provides the infrastructure for implementing asynchronous, message-based solutions that are built on the publish-and-subscribe model or one of its variants, such as, for example, request/reply, publish-and-wait, and the like.

The broker 204 routes documents between information producers (e.g., publishers) and information consumers (e.g., subscribers). Thus, the broker 204 receives, queues, and delivers documents. The broker 204 maintains a registry of document types that it recognizes. It also maintains a list of subscribers that are interested in receiving those types of documents. When the broker 204 receives a published document, it queues it for the subscribers of that document type. Subscribers retrieve documents from their queues. This action usually triggers an activity on the subscriber's system that processes the document.

Multiple brokers 204 optionally may be provided to a system 200. Multiple brokers 204 can operate in groups, called territories, which allow several brokers 204 to share document type and subscription information.

The following is a brief description of the basic building blocks of an integration solution that uses the publish-and-subscribe model. These building blocks include, for example, documents, publishable document types, triggers, services, adapter notifications, and canonical documents. A more detailed description of how messages can be sent and how the application integration system can be implemented is described, for example, in commonly assigned application Ser. No. 11/896,310, the entire contents of which are incorporated herein by reference. In this regard, it will be appreciated that the implementations set forth therein reflect the general techniques associated with one publish-and-subscribe approach to providing application integration solutions developed by the assignee of the instant application.

In an integration solution built on the publish-and-subscribe model, applications publish and subscribe to documents. Documents are objects that the above-noted components may use to encapsulate and exchange data. A document represents the body of data that a resource passes to the components. Often, it represents a business event, such as, for example, placing an order (e.g., via a purchase order document), shipping goods (e.g., via a shipping notice), adding a new employee (e.g., via a new employee record), etc.

Each published document includes an envelope. The envelope is much like a header in an email message. The envelope records information, such as, for example, the sender's address, the time the document was sent, sequence numbers, and/or other useful information for routing and control. It includes information about the document and its transit through the system.

Every published document is associated with a publishable document type. A publishable document type is a named schema-like definition that describes the structure of a particular kind of document that can be published and subscribed to. An instance of a publishable document type can be published locally within an integration server or can be published to a broker. In a publication environment that includes a broker, each publishable document type may be bound to a broker document type. Clients on the broker subscribe to publishable document types. The broker uses publishable document types to determine which clients to distribute documents to.

Within the publish-and-subscribe model of certain example embodiments described herein, triggers may establish subscriptions to publishable document types. Triggers also may specify the services that will process documents received by the subscription. Within a trigger, a condition associates one or more publishable document types with a service.

Services are method-like units of work. They contain program logic that the integration server executes. Services may be built to carry out work, such as, for example, extracting data from documents, interacting with back-end resources, publishing documents to the broker, etc. When a trigger is built, a user may specify the service to be used to process the subscribed-to documents.

Adapter notifications notify the system whenever a specific request was received from an adapter's resource. The adapter notification publishes a document when the specified indication was received from the resource. Each adapter notification has an associated publishable document type. Triggers may be used to subscribe to the publishable document types associated with adapter notifications. The service associated with the publishable document type in the trigger condition may, for example, perform some additional processing, updating, and/or synchronization, e.g., based on the contents of the document received.

A canonical document is a standardized representation that a document may assume while it is passing through the system. A canonical document acts as the intermediary data format between resources. For example, in an implementation that accepts purchase orders from companies, one of the steps in the process may convert the purchase order document to a company's standard purchase order format. This format is called the "canonical" form of the purchase order document. The canonical document is published, delivered, and passed to services that process purchase orders.

By converting a document to a neutral intermediate format, subscribers (e.g., adapter services) only need to know how to convert the canonical document to the required application format. If canonical documents were not used, every subscriber would have to be able to decode the native document format of every publisher.

A canonical document is a publishable document type. The canonical document may be used when building publishing services and subscribed to when building triggers. In flow services, documents may be mapped from the native format of an application to the canonical format.

When an integration server is connected to a broker, the path a document follows on the subscriber side includes, for example, retrieving the document from the broker, storing the document on the integration server, and processing the document. The subscription path for a document may depend on whether the document was published to all subscribers (e.g., broadcast) or delivered to an integration server directly.

An overview of the steps for building a publish-and-subscribe solution is now provided. In brief, on the publishing side, a user creates publishable document types associated with an adapter notification. On the subscribing side, by deploying a process model to a process engine, matching triggers will be created that associate the incoming documents with services that processes the documents. Further details on trigger design and configuration are provided in commonly assigned application Ser. No. 11/896,310, the entire contents of which are hereby incorporated herein by reference.

Figure 3:
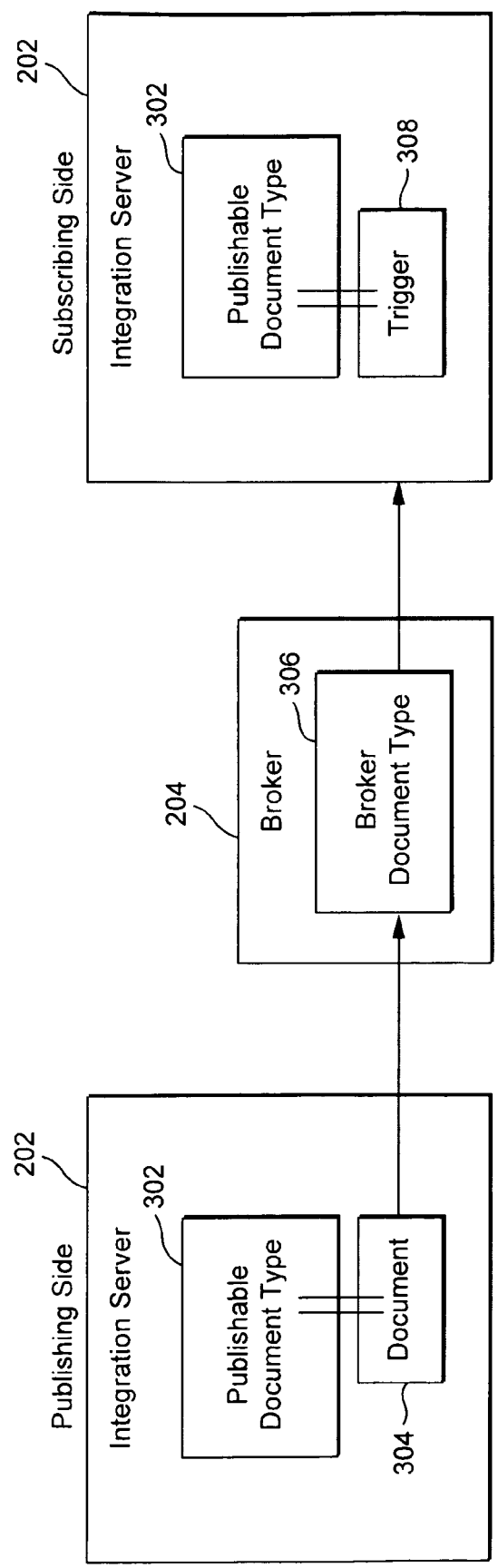
FIG. 3 shows the two sides of a publish-and-subscribe model integration solution, with publishable document types being associated with the same broker document type.

When a broker is included in the integration solution, each publishable document type has a corresponding broker document type on the broker. FIG. 3 shows the two sides of a publish-and-subscribe model integration solution, with publishable document types being associated with the same broker document type. In a publish-and-subscribe integration solution, both the publishing side and the subscribing side use the same publishable document type 302. The publishing side uses the publishable document type 302 when publishing the document 304 to the broker 204 to identify the type of document being published. The subscribing side references the publishable document type 302 in the trigger 308 to indicate the type of document being subscribed to. For the integration solution to work correctly, the publishable document type 302 on the publishing side and the subscribing side should reference the same broker document type 306. It is noted that the "publishing side" integration server 202 hosts the adapter together with the PMA that publishes documents as it executes the adapter notifications, whereas the "subscribing side" integration server 202 hosts the process engine that subscribes to these documents.

Figure 4:
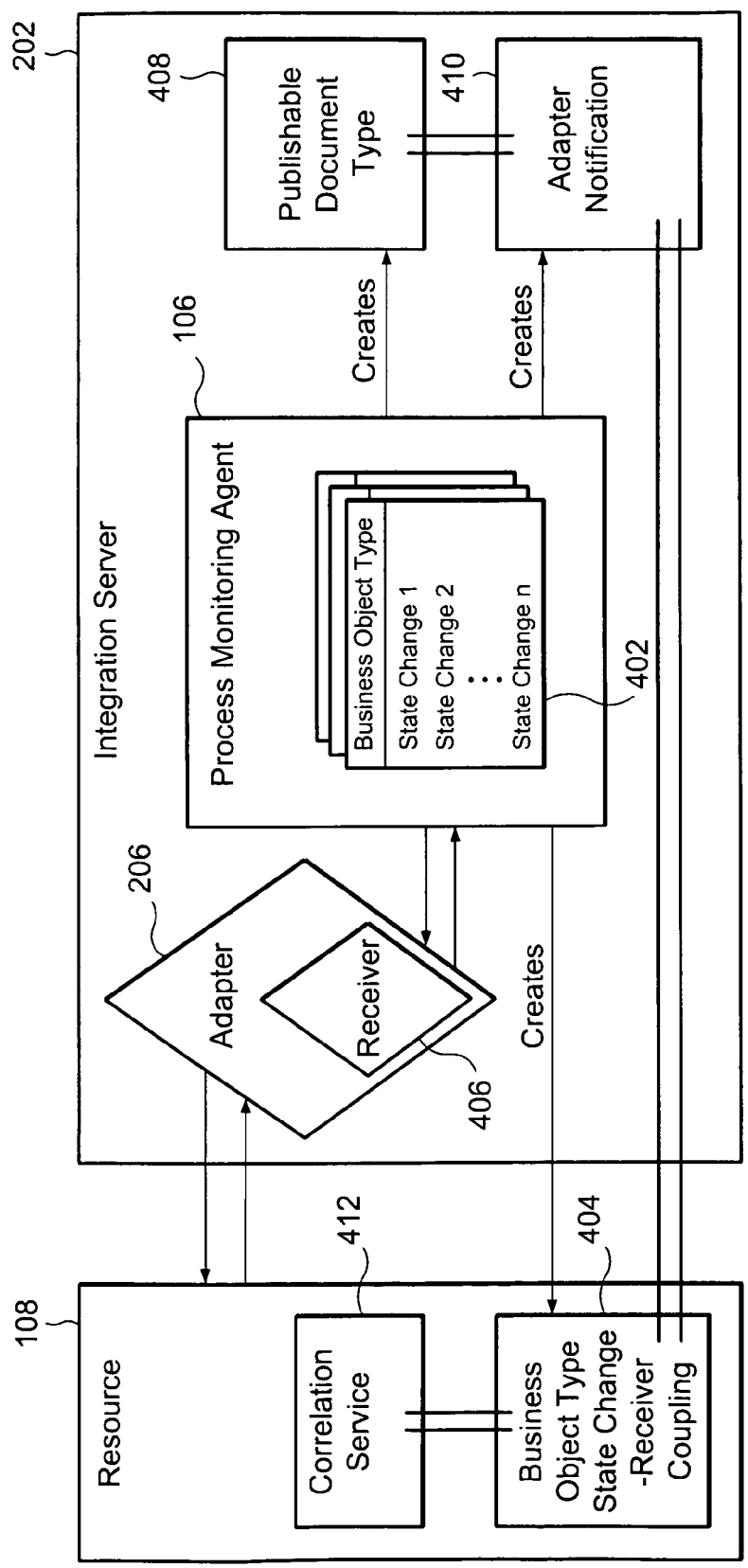
FIG. 4 is a design time block diagram showing a resource connected to an integration server via an adapter and a process monitoring agent in accordance with an example embodiment.

These techniques may be used to implement the management and/or monitoring techniques of certain example embodiments. For example, FIG. 4 is a design time block diagram showing a resource 108 connected to an integration server 202 via an adapter 206 and a process monitoring agent 106 in accordance with an example embodiment. In other words, during design time, a connection with the resource 108 is established by means of the technical adapter 206. Information (typically in the form of metadata) about the existing business objects state changes may be requested from the resource 108 once this connection has been established. Thus, a PMA 106 may have access to information regarding business object types 402 and state changes thereof.

The user then selects a business object state change of interest, which ultimately results in the creation of three constructs. First, a publishable document type 408 is created, with the publishable document type 408 describing the state change and its parameters. Secondly, adapter notification 410 may be produced, referencing the publishable document type 408. Third, a business object type state change to receiver coupling (also sometimes referred to as an event-receiver-coupling) 404 is created. An adapter notification 410 also is based at least in part on the event-receiver-coupling 404.

The event-receiver-coupling 404 also allows a user to specify a correlation service 412. The correlation service 412, in essence, is a pre-processing service that may be invoked to allow the user to alter an event container before passing it to the receiver 406 in the adapter 206. It is noted that the adapter 206 may include one or more receivers 406.

The adapter notification may be enabled, which also will enable the coupling at the resource 108, itself. From this point on, whenever a business object state change occurs in the resource 108, the receiver 406 that "listens" to state changes in a resource running in the adapter 206 will be notified. Further processing between the integration server 202 hosting the PMA 106, adapter 206 and the integration server hosting the PE may be similar to or otherwise conform to the techniques described in connection with FIG. 3 above.

To achieve the end-to-end visibility, a user may model the whole business process. Adapter notifications may be represented as events, e.g., according to the business process modeling notation (BPMN). An example business process model is shown in, and discussed in detail below in connection with, FIG. 8. Further details regarding the functionality of the structure appearing in FIG. 4 are provided below (e.g., in connection with FIG. 5).

Figure 5:
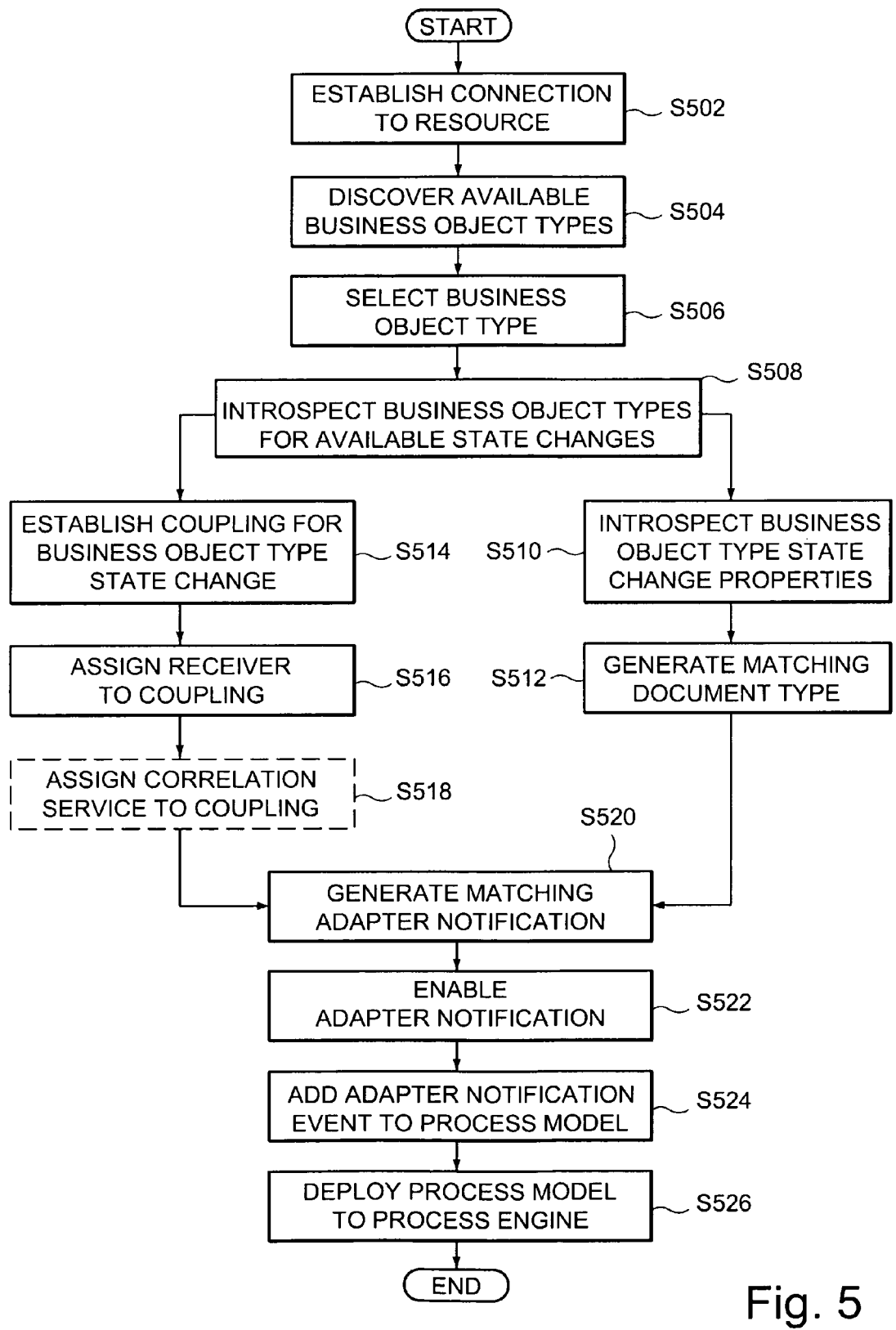
FIG. 5 is a flowchart of an example design time process in accordance with an example embodiment.

FIG. 5 is a flowchart of an example design time process in accordance with an example embodiment. The FIG. 5 flowchart shows how adapter notifications may be defined, created, and modified at a process monitoring agent, as well as how such adapter notifications may be deployed as events to the process engine in accordance with an example embodiment. With reference to the FIG. 1 example, as alluded to above, the deployed events may be those shown in the PE 102, namely, events 1, 3-4, 6-7, and 9-11. The detailed functionality of the example runtime process shown in FIG. 5 follows.

A request is made to define, create, or modify a business process model with an event representing a state change in a remote resource that is connected to the local PE via the ESB. Functionality provided by the underlying ESB allows the PMA to establish a client connection to the resource in question (S502). This may be accomplished by using a previously configured adapter, and/or by setting up one or more new adapters. The PMA then discovers the business object types involved in an activity, event, or object executed at the remote resource (S504). Business object types represent elements of a resource such as, for example, table entries, tables, databases, documents, etc. The discovery of the business object types may involve, for example, an automated scan of the resource, including any metadata associated with the business object types in the resource, so as to expose elements of the resource. In certain example embodiments, a user may guide the discovery of available business object types, e.g., by selecting resources, providing search criteria, etc. A specific business object type is then selected (S506). For example, a specific business object type may be selected from a presented list of available business object types.

As a result of the processing detailed above, the presentation of the available state changes for the selected business object types is presented (S508), and a specific state change from the presented list of available state changes is selected. As above, this may be accomplished in certain example embodiments by reading through metadata. Typically, metadata is provided in a highly structured and known format. This facilitates the automatic search for and retrieval of business object types and the possible state changes thereof—although manual user searching and/or specification also may be enabled in certain example embodiments. In certain example embodiments, a cache of known metadata may be maintained, with the cache being, for example, version specific and/or updatable. Indeed, an interface may be provided to clear the cache, add or remove components, provide updates, etc.

Two separate but related processes are then performed, which respectively correspond to the left and right branches shown in the approximate middle of the FIG. 5 example flowchart. These branches may be processed in parallel or in serial in different embodiments of this invention.

Referring to the right-hand side of the FIG. 5 example flowchart, the selection of a specific state change from the presented list of available state causes the introspection of the selected business object type state change properties (S510), and the creation or generation of a matching local document type (S512). In a consumer purchase order application, the properties searched for (e.g., in S510) could include, for example, order number, customer name, etc. Other extracted properties may include, for example, process data (such as the start and end time of a process instance), error data, business data (such as customers, order quantities, and revenues), etc. The matching local document type, once created or generated, is registered with the ESB in one or more steps not shown. The matching document type represents the state change properties and is created in a known or common namespace for the platform, e.g., using metadata arranged according to a known format that is persisted in the platform. A one-to-one mapping may be provided in certain implementations, although this may not always be the case (e.g., in a case where document types are reused for other adapter notifications, etc.). In other words, the right-hand side of the FIG. 5 example flowchart helps to create an adapter notification (S520) for the resource.

Referring to the left-hand side of the FIG. 5 example flowchart, the PMA establishes a coupling for the business object type state change in the remote resource (S514), designating itself as the receiver for the assigned coupling (S516). The process (e.g., S514 and S516) helps force a resource to trigger events accessible in the central or local PE, e.g., by providing a coupling between a business object state change in the resource and a receiver in the adapter by first discovering the business object state change and then representing and enabling it as an adapter notification to create a suitable event. Indeed, a receiver may, in certain example embodiments, be persisted in an adapter notification so that a document type is linked to a listening connection. In other words, an event receiver may be notified when a business object is altered, and an event-receiver-coupling ties a receiver to the business object state change. The coupling may be uniquely defined, e.g., as a triple comprising the business object type, the business object state change, and the receiver. On the integration server, event-receiver-couplings may be represented as adapter notifications, thus allowing business object state changes to be represented as events in a business process model.

Optionally, a remote correlation service may be assigned for the coupling (S518). For example, a correlation service may perform some sort of pre-processing at the event container such as, for example, linking each document to one process instance. In this regard, a master process instance identification list may be created and/or maintained (e.g., at a central location) to track the relation between business object state changes. In certain example embodiments, the assignment of a remote correlation service to a coupling may include adding an identifier field to the event container so as to facilitate the tracking of related business object state changes. In contrast, in certain example embodiments, a local correlation service may track a process id more directly. Of course, it will be appreciated that other techniques for tracking the relation between business object state changes also may be implemented in different embodiments, e.g., as a combination of a remote and local correlation services where the remote correlation service adds a previously processed document identifier to the event container whereas the local correlation service then reads both the current and the previous document identifier in order to maintain the process instance identification list.

The coupling may be persisted and/or registered locally, e.g., as a listening notification, with the ESB tied to the generated document type (S520). The listening notification may be represented as an event in a process model with the document type defining the event input signature (S524). By enabling the local adapter notification (S522), and deploying the process model to the local PE (S526), the local PE is put in a position to "listen" to state changes from a remote resource, and is able to manage and/or monitor business processes in an end-to-end manner.

Figure 6:
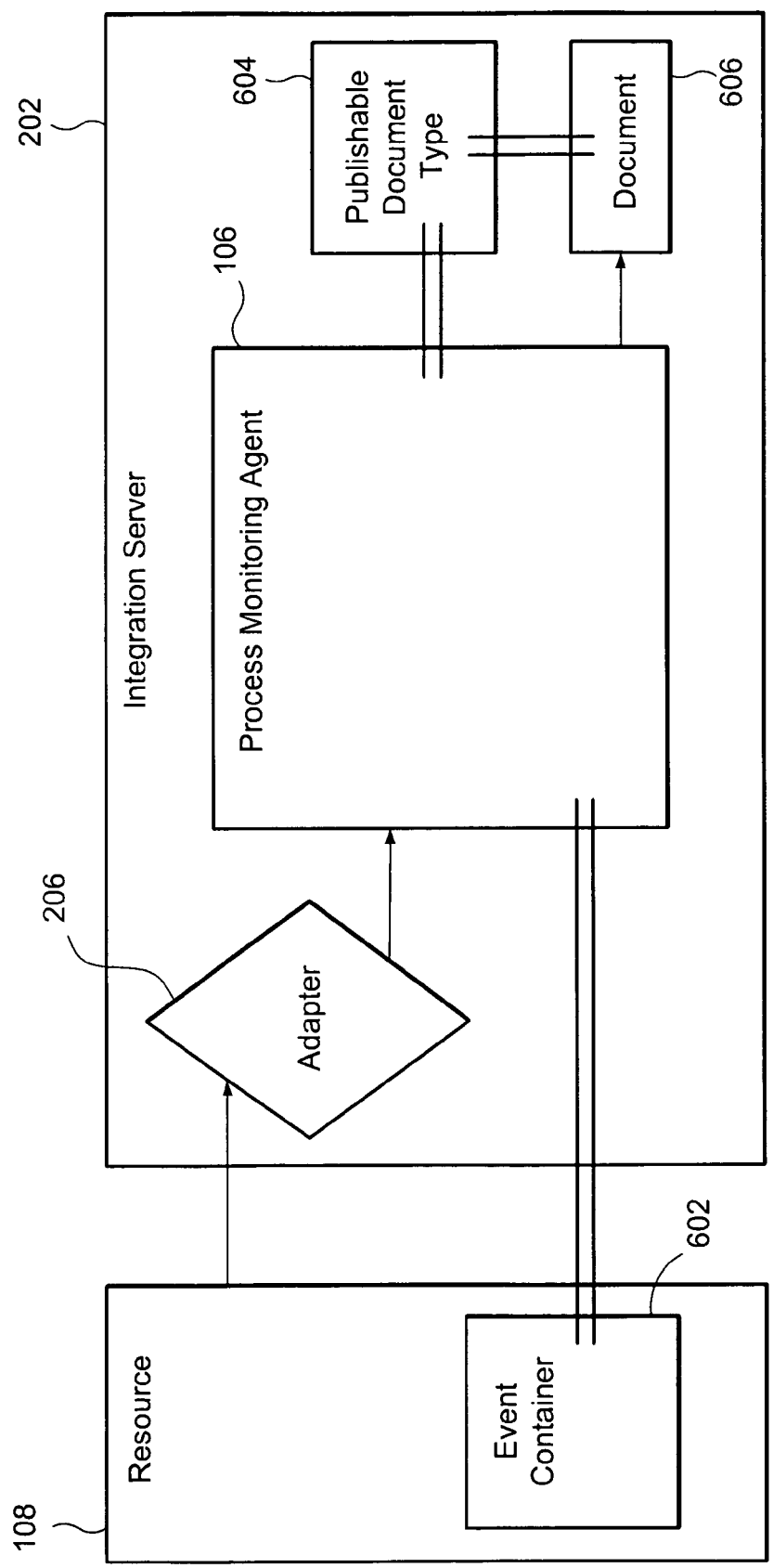
FIG. 6 is a runtime block diagram showing a resource connected to an integration server via an adapter and a process monitoring agent in accordance with an example embodiment.

FIG. 6 is a runtime block diagram showing a resource 108 connected to an integration server 202 via an adapter 206 and a PMA 106 in accordance with an example embodiment. As shown in FIG. 6, the PMA is now in position to convert the received event container into a document that will be published to the broker. This is due, in part, to the fact that the connectivity to the resource in certain example embodiments is provided by a "pure" technical adapter 206. The PMA 106 merely provides "business knowledge" for establishing a contract between the event container 602 and the publishable document type 604.

Thus, as shown in FIG. 6, processing by the resource 108 is monitored by the PMA 106 through the adapter 206. The PMA 106 uses the publishable document type 604 in generating a document 606 to be consumed by a trigger 308 on the "subscribing side" of FIG. 3. The PMA 106 also uses data from an event container 602 of the resource 108 in producing the document 606. Further details regarding the functionality of this structure are provided below (e.g., in connection with FIG. 7).

Figure 7:
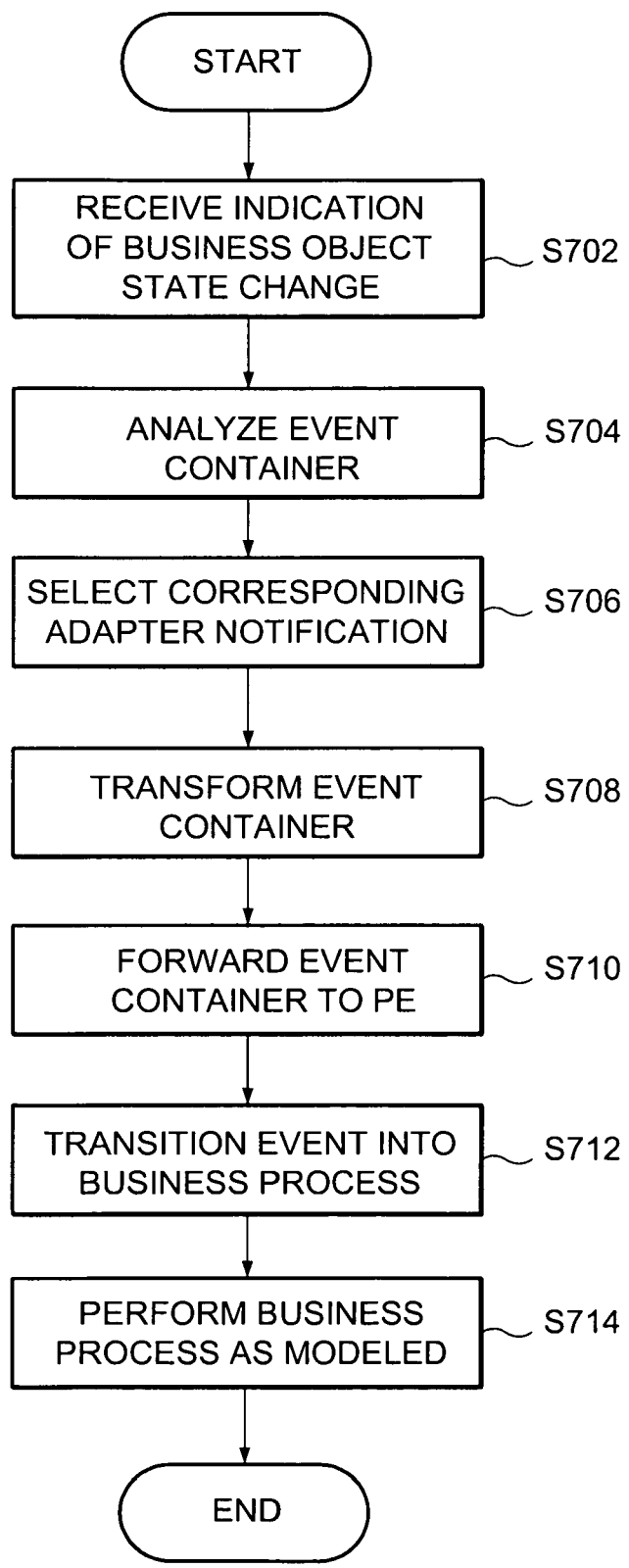
FIG. 7 is a flowchart of an example runtime process in accordance with an example embodiment.

FIG. 7 is a flowchart of an example runtime process in accordance with an example embodiment. Thus, FIG. 7 illustrates a process that handles a single adapter notification representing a state change in a remote resource as a part of an end-to-end business process managed and/or monitored by the local PE, in accordance with an example embodiment. With reference once again to the FIG. 1 example, as alluded to above, those shown in the PE 102, namely, events 1, 3-4, 6-7, and 9-11, may be handled in accordance with the illustrative techniques shown in and described in connection with the FIG. 7 example flowchart.

In FIG. 7, an indication of a business object state change is received by the PMA (S702), provided that a coupling was previously established (e.g., as shown in and described in connection with the FIG. 5 example flowchart). The PMA analyzes the received event container (S704), and selects a corresponding adapter notification (S706). Before notifying the PE about the received event, the event container may be transformed (S708), e.g., into a publishable document type expected and/or processable by the PE. It will be appreciated that this step may involve transforming the event container into a format suitable for a proprietary pipeline structure. Thus, after this transformation (in S708), the event container is forwarded to the PE (S710), again as described in FIG. 3. The PE transitions the event into the end-to-end business process as previously defined by the business process model (S712). Ultimately, the business process as modeled is performed (S714).

Although the flowchart shown in FIG. 7 is linear, the invention is not so limited. For example, the steps included therein may be performed in various orders in certain example embodiments (such as, for example, multi-threaded embodiments). In such example cases, event containers can be transformed one at a time or in batch. The transformed event containers may be forwarded one at a time or in batches, e.g., so that processing may begin as further event containers are transformed.

FIG. 8 is an example "order to cash" business process used to illustrate several aspects of certain example embodiments.

The FIG. 8 example business process includes both manufacturer processes and activities 802 and customer activities 804. In accordance with certain example embodiments, the manufacturer processes and activities 802 comprise processes and activities that take place at both the integration server 802a, as well as in an external resource 802b which, in this example, is an SAP system. The processes and activities that take place at both the integration server 802a as well as in an external resource 802b are grouped together under the manufacturer processes and activities 802 in FIG. 8, emphasizing that a suitably configured process engine can provide end-to-end management and/or monitoring of the business process, since the integration server and external resource have been configured to communicate with one another using a suitably configured PMA according to an example embodiment.

According to the FIG. 8 example business process, from within the customer "swim lane" 804, a customer may initiate a phone, fax, or mail order; submit an electronic order; receive notifications from the manufacturer; and/or receive an invoice from the manufacturer. When a customer initiates a phone, fax, or mail order, a customer inquiry may be created (which, in turn, may lead to a customer quotation being created), a customer may directly request a quotation, a sales order may be created, and/or a sales order may be changed. A customer quotation ultimately may prompt the creation of a sales order. When a customer submits an electronic order from within the customer swim lane 804, an electronic order may be received, an electronic order change may be received, an error may be generated upon the creation of an electronic order, and/or an error may be generated upon the creation of an electronic order change. The receipt of an electronic order or an electronic order change may respectively create a sales order or a sales order change, e.g., in much the same manner as if the order had been received via phone, fax, or mail. Once a sales order or a sales order change has been created, it may be processed. These operations may take place within the SAP system swim lane 802b.

In a case where the processing of the sales order indicates that either a sales order billing block or a sales order delivery block should be set in the SAP system 802b, such errors may be handled from within the integration server swim lane 802a. Similarly, in a case where an error is generated upon the creation of an electronic order or upon the creation of an electronic order change, such errors also may be handled from within the integration server swim lane 802a.

If no errors are generated during the processing of the sales order, the order may be post-processed and an electronic order response may be received from within the integration server swim lane 802a. Following the receipt of an electronic order response, an outbound delivery may be created from within the SAP system swim lane 802b. Together with the receipt of an electronic delivery confirmation from within the integration server swim lane 802a, the creation of the outbound delivery from within the SAP system swim lane 802b may prompt a post-process delivery activity from within the integration server swim lane 802a. The post-process delivery activity may send suitable notifications to the customer, as indicated by the message flow to the customer swim lane 804.

The post-process delivery activity also may cause the outbound delivery to be posted, leading to the creation of a customer billing document. Both of these steps may be performed within the SAP system swim lane 802b. Together with the receipt of an electronic invoice in the integration server swim lane 802a, the creation of the customer billing document may prompt post processing of the billing document from within the integration server swim lane 802a. This ultimately may lead to the creation of an invoice delivered to the customer, as indicated by the message flow to the customer swim lane 804.

The design time and runtime techniques described above may be implemented in accordance with this example business process. The following lists various sample business object state change properties that may be retrieved in accordance with this example business process. Of course, it will be appreciated that other and/or different business objects types, business object state changes, properties, etc., may be appropriate for use in connection with this and/or other modeled business processes. In other words, it will be appreciated that the following is merely illustrative for one portion of this particular example and is not limiting.

| Business object type: | Sales Order |
|---|---|
| Business object state change: | Created |
| Business object state change properties: | |
| Document Number | Sales document number |
| Items | Sales Document Items |
| OrderingParty | Sold-to Party |
| DistributionChain | Distribution Chain |
| SalesOrganization | Sales Organization |
| SalesAndDistribArea | Sales Area |
| DocumentDate | Document Date (Date Received/Sent) |
| DistributionChannel | Distribution Channel |
| Division | Division |
| NetValue | Net Value of the Sales Order in Document Currency |
| DocumentCurrency | SD Document Currency |
| CompanyCodeCurrency | Local Currency |
| ExchangeRate | Exchange Rate for Pricing and Statistics |

For instance, the document published by the PMA may be one event starting a business process as outlined in application Ser. No. 11/896,312, it could be an intermediate event occurring somewhere during the business process, etc.

It will be appreciated that as used herein, the terms system, subsystem, service, programmed logic circuitry, and the like may be implemented as any suitable combination of software, hardware, firmware, and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of configuring an application integration system for end-to-end business process management, business event management, and/or business activity monitoring, the method comprising:
establishing a connection between a process engine and at least one resource external to the process engine, the at least one resource including at least one activity, event, or object useful in modeling a business process being representable as an event at the process engine;
identifying at least one business object type of one said activity, event, or object;
selecting a business object type for further introspection;
introspecting the selected business object type to identify a state change thereof;
introspecting a selected state change of the selected business object type to identify business object state change properties;
creating a matching local document type suitable for processing by the process engine corresponding to the selected state change of the selected business object type;
establishing a coupling for the selected state change of the selected business object type via a process monitoring agent;
assigning a receiver for the coupling, the receiver being connected to the process monitoring agent such that the receiver is configured to trigger a notification according to the matching local document type in the application integration system;
generating a matching adapter notification;
enabling the matching adapter notification;
adding the adapter notification as an event in the process model; and
deploying the process model to the process engine such that the process engine is configured to listen to state changes from the at least one remote resource in managing and/or monitoring the business process.

2. The method of claim 1, wherein the connection between the process engine and the at least one resource external to the process engine is established using a pre-configured adapter, and
wherein the receiver is associated with the adapter.

3. The method of claim 1, further comprising scanning metadata associated with the activity, event, or object in the identifying of the at least one business object type of the activity, event, or object.

4. The method of claim 1, further comprising scanning metadata associated with the selected business object type in identifying the state change and/or state change properties thereof.

5. The method of claim 1, further comprising registering the matching local document type with the application integration system, the matching local document type corresponding to the business object state change properties from the at least one resource is created in a known or common namespace of the application integration system using metadata arranged according to a known and persisted format.

6. The method of claim 1, further comprising uniquely defining the coupling as a triple including the business object type, business object type state change, and receiver.

7. The method of claim 1, further comprising providing a local and/or remote correlation service for the coupling, the correlation service being configured to link each document to one process instance.

8. An application integration system for end-to-end business process management, business event management, and/or business activity monitoring, the system comprising:
an adapter configured to establish a connection between a process engine and at least one resource external to the process engine, the at least one resource including at least one activity, event, or object useful in modeling a business process representable as an event at the process engine;
at least one processor configured to communicate with a process monitoring agent configured to:
identify at least one business object type of one said activity, event, or object,
select a business object type for further introspection,
introspect the selected business object type to identify a state change thereof,
introspect a selected state change of the selected business object type to identify business object state change properties, create a matching local document type suitable for processing by the process engine corresponding to the selected state change of the selected business object type,
establish a coupling for the selected state change of the selected business object type via the process monitoring agent,
assign a receiver for the coupling, the receiver being associated with the adapter and being connected to the process monitoring agent such that the receiver is configured to trigger a notification according to the matching local document type in the application integration system;
generate a matching adapter notification;
enable the matching adapter notification;
add the adapter notification as an event in the business process; and
deploy the process model to the process engine such that the process engine is configured to listen to state changes from the at least one remote resource in managing and/or monitoring the business process.

9. The system of claim 8, wherein the process monitoring agent is further configured to scan metadata associated with the activity, event, or object when the at least one business object type of the activity is identified.

10. The system of claim 8, wherein the process monitoring agent is further configured to scan metadata associated with the selected business object type in identifying the state change and/or state change properties thereof.

11. The system of claim 8, wherein the process monitoring agent is further configured to register the matching local document type with the application integration system, the matching local document type corresponding to the business object state change properties from the at least one resource is created in a known or common namespace of the application integration system using metadata arranged according to a known and persisted format.

12. The system of claim 8, wherein the coupling is uniquely defined as a triple including the business object type, business object state change, and receiver.

13. The system of claim 8, further comprising a local and/or remote correlation service for the coupling, the correlation service being configured to link each document to one process instance.

14. The system of claim 8, wherein the process monitoring agent is further configured to:
receive an indication of a state change of a business object at the process monitoring agent in accordance with a pre-defined coupling;
analyze an event container of the indication and select a corresponding adapter notification;
transform the event container into a document of a document type processable by the process engine; and
forward the document to the process engine in managing and/or monitoring the business process.

* * * * *